July 19, 1938.  A. B. BELL  2,123,927
CAM-TYPE REVERSIBLE CAR SEAT BASE
Filed June 4, 1936   5 Sheets-Sheet 1
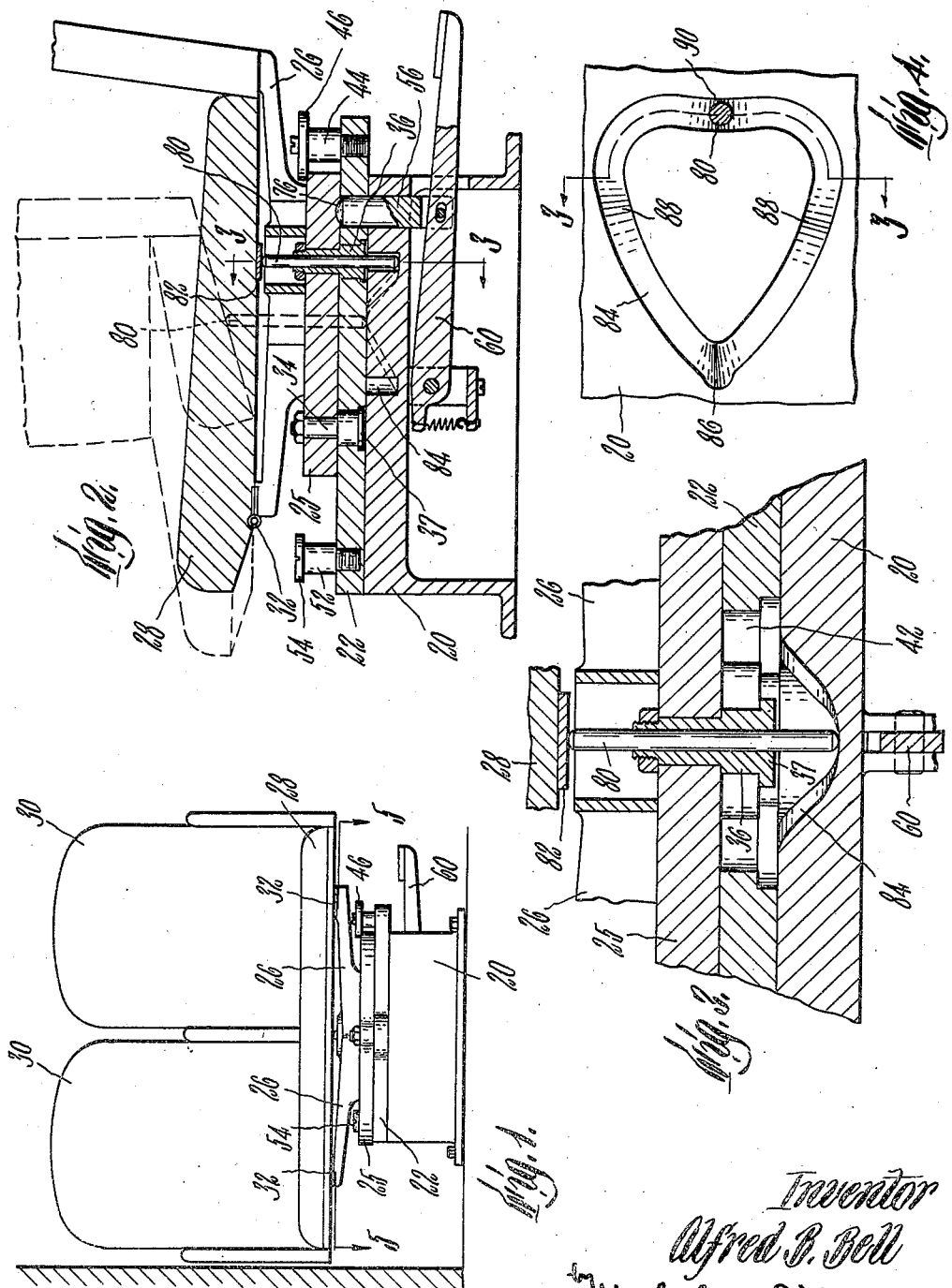

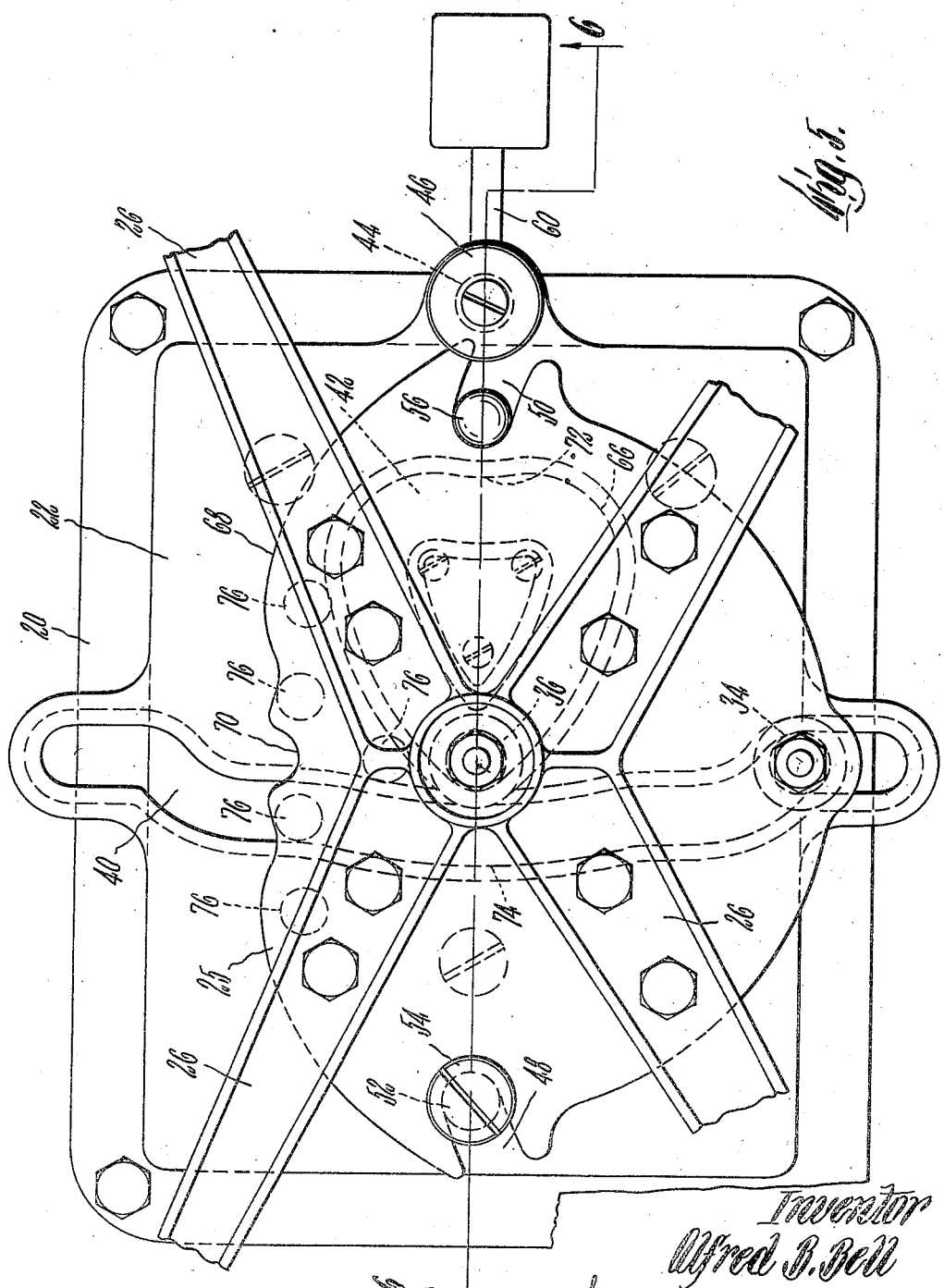

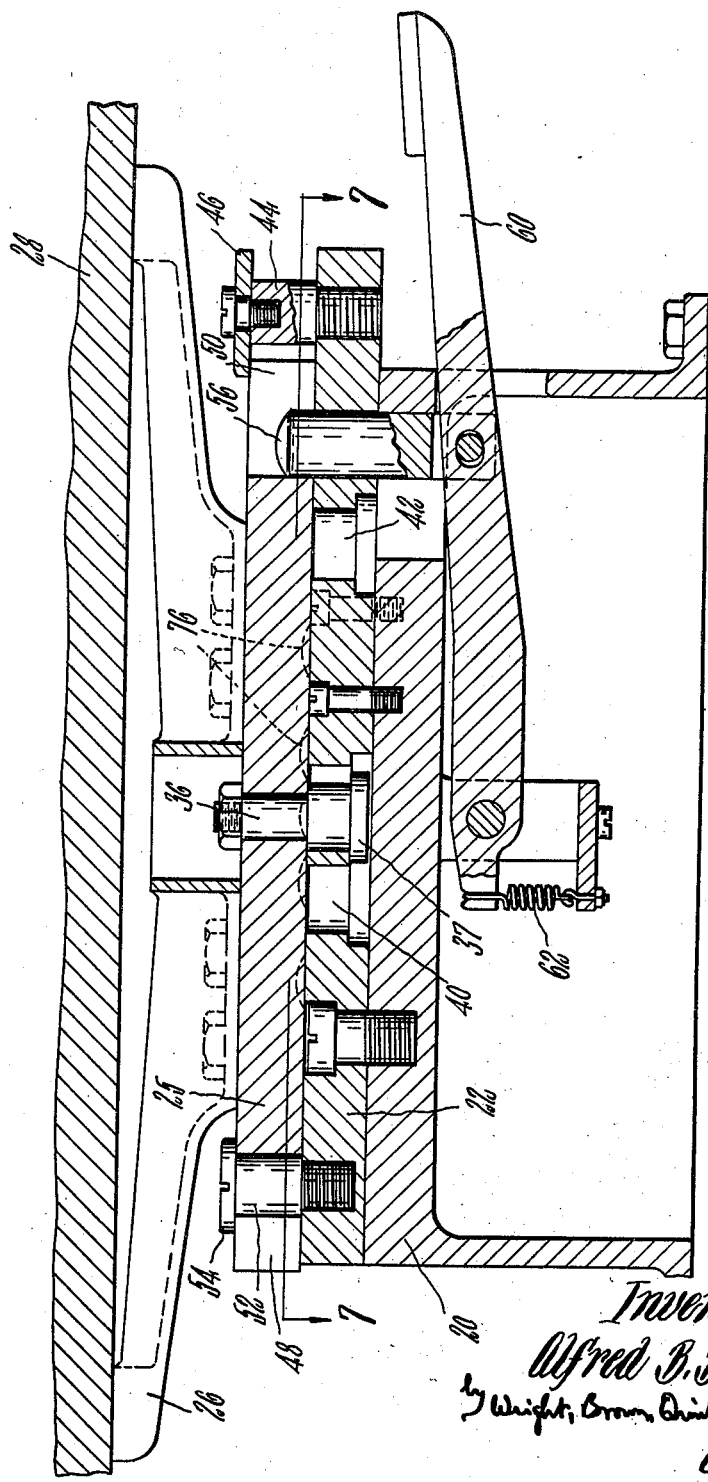

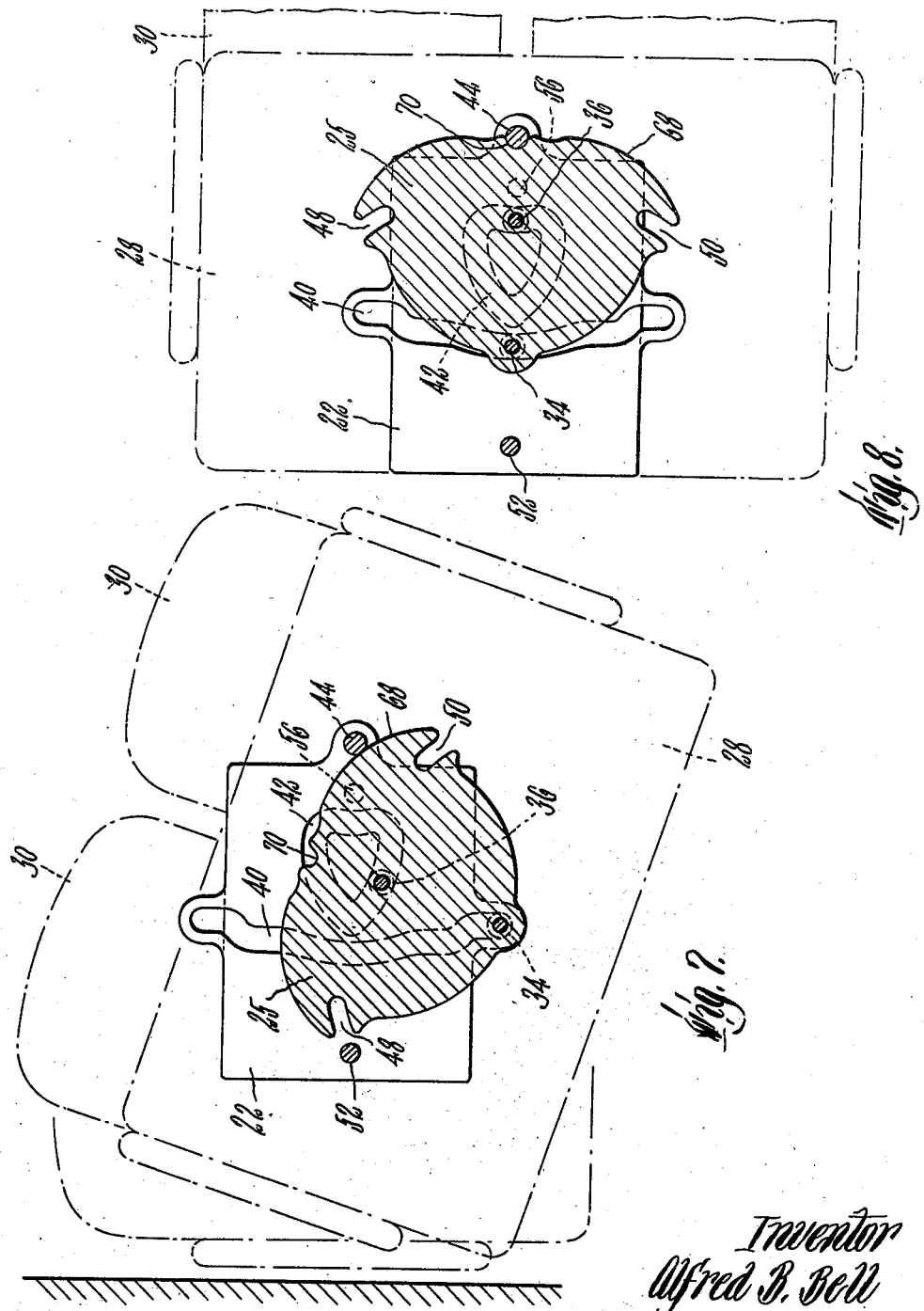

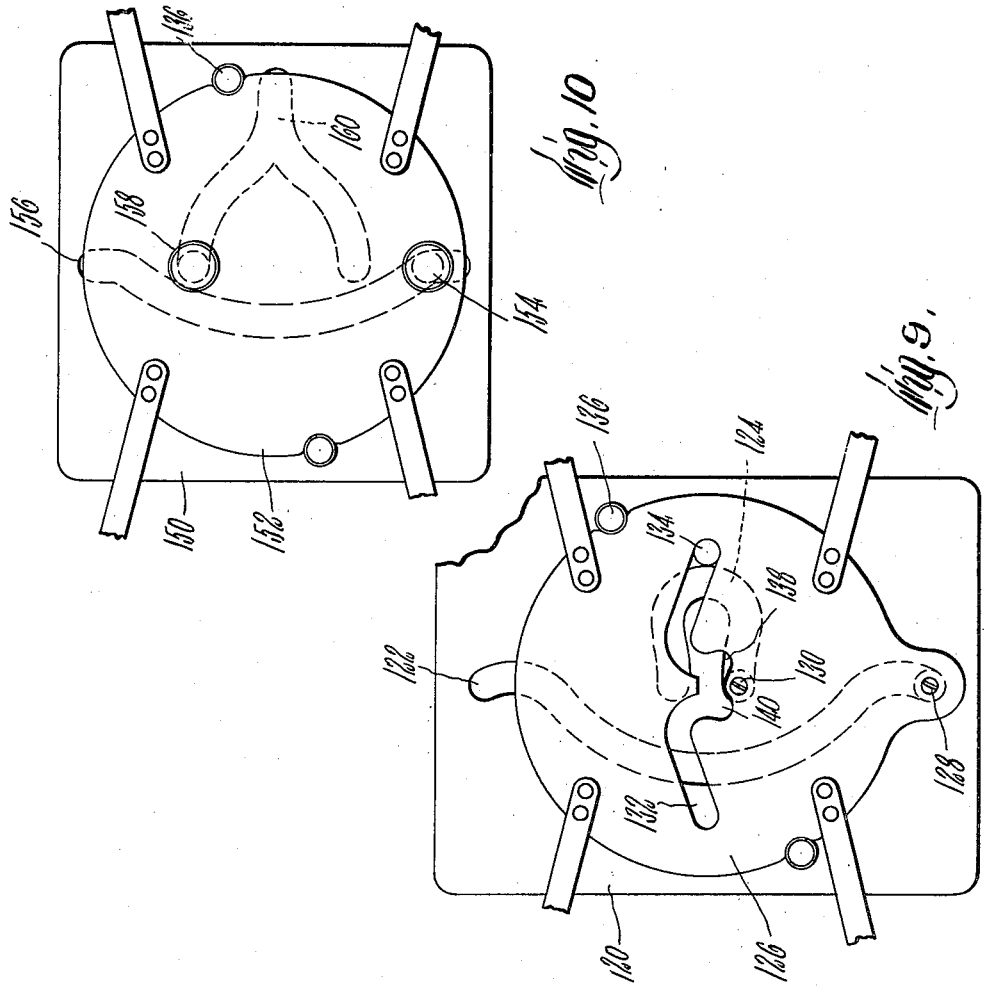

Patented July 19, 1938

2,123,927

UNITED STATES PATENT OFFICE 2,123,927

CAM-TYPE REVERSIBLE CAR-SEAT BASE

Alfred B. Bell, Gardner, Mass., assignor to Heywood-Wakefield Company, Boston, Mass., a corporation of Massachusetts Application June 4, 1936, Serial No. 83,494

7 Claims. (Cl. 155—96)

This invention relates to car-seat bases, more particularly intended for use in vehicles such as railway cars where it is desirable to reverse the position of the seats by rotation thereof about a vertical axis, the seats being mounted on a pedestal which is secured to the floor of the vehicle.

In designing railway cars and the like, it is desirable to provide maximum aisle width consistent with sufficient width of the seats to accommodate the passengers. It is also desirable to employ as many seats as possible in a car of given length so as to accommodate the maximum number of passengers. There is considerable demand for car seats of a type which must be rotated about a vertical axis to reverse their positions. Since the general plan contour of a car seat is substantially rectangular, the pedestal must be so placed as to permit the corners of the rectangle to avoid interference with the side wall of the vehicle. To this end, it is necessary either to mount the seats away from the wall a sufficient distance to clear the wall when swung to reverse position, thus encroaching on the space available for aisle width, or to provide a seat-base mechanism such that the seat is permitted or constrained to move away from the car wall before or during the initial portion of the rotation from one position of use to the other. In placing car seats as near to one another as possible to economize space in a front-to-rear direction, care must be taken to avoid interference between the backs of successive seats during the rotation thereof from one position to another, where stationary or reclining seat backs are employed. To avoid such interference without unduly spacing successive seats apart, the seat-base mechanism is designed to cause the seat to have a forward component of motion during the initial portion of its rotation. This moves the seat away from the seat immediately behind it and thus permits closer spacing of successive seats without mutual interference.

It is an object of the present invention to provide reversible car-seat base mechanism of the cam type adapted to move the seat a substantial distance away from the wall and also away from the seat to the rear of it during the initial portion of rotative movement from one position of use to the other. The cam mechanism is preferably symmetrical, so that the movements of the seat during the initial 90° of rotation are repeated in reverse during the final 90° of rotation, and so that the character of movement of the seat during initial rotation from either position of use is the same. As an added feature, provision may be made for automatically tilting the seat forward during a portion of the rotation so as to assist further in avoiding interference with the seat immediately behind.

In order to obtain a relatively rapid movement of the seat away from the vehicle wall during the initial portion of the rotation, it is desirable to swing the seat initially about a pivotal point which is as far forward of the endwise median line of the seat as possible. It is evident that the further the pivot is from the endwise median line of the seat, the more rapidly will the seat move away from the wall during its initial rotation. Movement of the pivot itself toward the wall of the vehicle should be avoided during the initial rotation of the seat so that the effect of the outward movement of the seat will not be nullified. It is also desirable that the pivot be restrained from movement toward the endwise median of the pedestal during initial rotation of the seat. This results in a forward movement of the center of the seat to avoid interference with the seat behind. It is an object of the present invention to provide novel cam means having the foregoing characteristics whereby reversible seats of the rotating type may be located close to the wall of the vehicle and close to each other, thus providing maximum aisle width and minimum distance between seat centers, thus accommodating the maximum number of passengers.

For a more complete understanding of the invention, reference may be had to the description of certain embodiments thereof which follow and to the drawings of which Figure 1 is an elevation of a car seat and base embodying the invention.

Figure 2 is a vertical section of the structure shown in Figure 1, the seat being turned half way between its extreme positions of use.

Figure 3 is a fragmentary section on the line 3—3 of Figures 2 and 4.

Figure 4 is a fragmentary plan view of the pedestal portion of the base.

Figure 5 is a plan view of the base indicated by the line 5—5 of Figure 1, the seat-tilting mechanism being omitted to avoid confusion of detail.

Figure 6 is a section on the line 6—6 of Figure 5.

Figures 7 and 8 are sectional views on the line 7—7 of Figure 6, showing the reversible portion of the base in different position, and Figures 9 and 10 are diagrammatic plan views of modified forms of structure embodying the invention.

As indicated in Figures 1 and 2, the invention may be embodied in a car-seat base comprising a pedestal portion 20 having a top plate 22 secured thereto. On this top plate is slidably mounted a carriage 25, shown in the form of a plate, to which are secured a number of arms 26 for supporting the seat 28. In the structure illustrated in Figures 1 and 2, the seat is provided with a back 30 which is adapted to tilt with the seat about the axis of suitable hinges 32. The carriage 25 is provided with a pair of pivotal cam followers 34 and 36 which project downward to ride in cam slots 40 and 42 respectively formed in the plate 22, the lower ends 37 of the followers being enlarged to act as hold-down elements, as indicated in Figure 5. The cam slot 40 is elongated and extends in a general front-to-rear direction. The cam slot 42 is heart-shaped, both slots being arranged symmetrically with respect to the endwise axis of the pedestal. The reversing operation of the seat base may be observed from Figures 5, 7 and 8 which illustrate the carrier 25 and its cam followers 34 and 36 in different positions. In these figures, the seat-tilting mechanism, shown in Figures 2, 3 and 4, is omitted to avoid confusion of detail. Figure 5 illustrates the car-seat base with the parts in one of the positions of use. In such position, the cam follower 34 is near one end of the cam slot 40 and the cam follower 36 is at the apex of the cam slot 42, the followers 34 and 36 being in a line perpendicular to the endwise axis of the pedestal. As shown in Figure 5, the carrier plate 25 has an irregular contour which, however, is symmetrical with respect to a line passing through the centers of the followers 34 and 36. The rear edge portion of the carrier plate 25 is an edge cam adapted to cooperate with a fixed guide or post 44 surmounted by a rotatable disk 46 which overlaps a portion of the carrier 25 to act as a hold-down member therefor. The carrier plate 25 is provided with a pair of opposed notches 48 and 50 adapted to receive a fixed post 52 having a flat head 54 acting as a hold-down member when the post is engaged in the notch 48 or 50, and a locking pin 56, which as indicated in Figure 6, may be connected to a treadle 60 so as to be withdrawn downwardly to permit movement of the carrier plate 25 on the top plate 22 of the pedestal. Suitable spring means, such as the tension spring 62, may be employed to hold the locking pin 56 yieldingly in its locking position. It is evident from Figure 5 that, when the seat is in either of its extreme positions of use, the post 52 and the locking pin 56, engaging snugly in the notches 48 and 50, prevent any rotating or sliding movement on the part of the carrier plate 25.

When the seat is rotated, the follower 36 moves along in the cam slot 42. If the center of the seat cushion is directly over the center of the follower 36, the center of the seat will follow a path, during its rotation, similar to the shape of the cam slot 42. If the seat cushion is offset forwardly as indicated in Figure 2, the path of movement of the seat center will be somewhat modified. As the follower 36 moves along the slightly curving portion of the cam slot 42, the follower 34 is constrained to move forward to the cam slot 40, taking the position illustrated in Figure 7. At the beginning of rotative movement of the seat from the position indicated in Figure 5, the pivot or fulcrum is the follower 34. During the initial portion of the rotation of the seat, this pivot moves forward to the end of the slot 40, thus causing the seat to shift forward a short distance as well as to shift away from the wall of the car before it has turned through any considerable angle. As the follower 36 reaches the bend 66 in the slot 42, the follower 34 moves away from the extreme end of the slot 40. Meanwhile the curved edge portion 68 of the carrier plate 25 has been riding along the post 44. As the seat approaches the mid-point of its rotation, the post 44 enters a notch 70 in the edge of the carrier plate 25 and serves temporarily as a fulcrum about which the carrier plate swings as the follower 36 travels along an arcuate portion 72 of the cam slot 42 and the follower 34 travels along an arcuate portion 74 of the cam slot 40, these two arcuate portions of the cam slots being concentric with the post 44. This temporary fulcrum or pivot is effective as the seat passes through its mid-point as illustrated in Figure 8. The remaining 90° of rotation is similar to the initial 90° except that the movements of the moving members take place in the reverse order, the cam follower 34 moving to the extreme end of the slot 40 and then back to a final position at the inner end of the straight portion of the slot. The cam follower 36 completes the circuit of the slot 42 and returns to the position shown in Figure 5. In moving from the position indicated in Figure 5 to the reverse position, the seat itself rotates in a clockwise direction but the movement of the cam follower 36 around the circuit of the cam slot 42 is in a counter-clockwise direction.

If it is desired to use the seat in positions which are intermediate with respect to the extreme positions of use, the under face of the carrier plate 25 may be provided with shallow recesses 76, these recesses being located so as to come in line successively directly over the end of the locking pin 56, the upper end of this pin being preferably rounded, as indicated in Figure 6, so as to ride out of such depressions readily as the seat is turned. Any desired or convenient number of such depressions 76 may be provided to hold the seat yieldingly in various angular positions. With the recesses indicated in Figure 5, five such intermediate positions are possible, the seat being yieldingly held after being rotated through angles approximately equal to 25°, 35°, 90°, 145° and 155° respectively.

If it is desired to tilt the seat during the initial rotation thereof so as to avoid interference with the seat immediately behind, a vertical plunger 80 may be slidably located within the cam follower 36. The upper end of this plunger preferably rests against a wear plate 82 mounted on the bottom of the seat cushion. The lower end of the plunger rides in a slot 84, the bottom of which serves as a cam surface causing the plunger to move vertically as the seat is rotated. The shape of the slot 84 necessarily follows the shape of the cam slot 42, since the plunger 80 must follow the same path as the follower 36 within which it is mounted. The bottom of the cam slot 84 has a low point 86 at the apex of the heart-shaped slot, this being the portion of the slot occupied by the plunger 80 when the seat is in either of its extreme positions of use. The bottom of the slot 84 rises from the point 86 in both directions to high points 88. The remainder of the bottom of the slot 84 may be at this high level unless it is desired to use the seat in an intermediate position. In such case, a second low point 90 is provided, this point being preferably on the endwise axis of the pedestal as is also the low point 86. Thus, when the seat is swung through 90°, that is, half of its complete turn from one extreme position to the other, the plunger 80 rises during the initial portion of the turn until it has traveled through the slot 84 to one of the high points 88. Thereafter the plunger 80 rides down hill to the low point 90 which it reaches when the seat has completed 90° rotation. The seat then faces the wall of the car and is in a position for use since the plunger 80 is not tilting the seat when it engages the low point 90 of the slot bottom.

It is evident that many varieties of cam shapes can be devised for modifying the lateral movement of the seat as it rotates. Some of these alternative forms are conventionally illustrated in Figures 9 and 10.

Figure 9 illustrates another modified form of reversible car-seat base. In this form the pedestal 120 is provided with an elongated slot 122 and a second slot 124 in the shape of a horseshoe. The carrier plate 126 is provided with a follower 128 to ride in the slot 122 and a second follower 130 to ride in the slot 124. The carrier plate itself is slotted as at 132, a fixed pin 134 mounted on the top of the pedestal 120 riding in this cam slot. A locking pin 136 holds the carrier plate 126 against movement until retracted. Thereupon the plate can be rotated in a clockwise direction from the position indicated in Figure 9. This causes initial movement of the follower 130 along the slot 124, the follower 128 remaining stationary to serve as a pivot until the follower 130 nearly reaches the bend of the horseshoe. Further movement of the follower 130 causes the follower 128 to start moving along its slot 122. When the follower 130 has reached the mid-point of the slot 124, the carrier plate 126 has moved so as to cause the fixed post 134 to enter the pocket 138 of the slot 132. The post 134 then acts as a temporary pivot and shifts from the pocket 138 to the pocket 140 as the follower 128 moves past the mid-point of the slot 122. The remainder of the rotation of the seat base is accompanied by movements of the followers similar to those described but in the reverse order until the followers 128 and 130 reach the opposite ends of their respective cam slots.

Figure 10 illustrates a pedestal 150 on which is a carrier plate 152 having a cam follower 154 riding in a slot 156, and a cam follower 158 riding in a Y-shaped cam slot 160, the cam slots 156 and 160 being formed in the top of the pedestal 150. The normal position of rest of the follower 154 is adjacent to but not at the end of the slot 156. When the seat is rotated in a clockwise direction, the shape of the cam slot 160 is such as to cause the follower 154 to move to the extreme end of the slot 156 as the follower 158 moves towards the intersection of the branches of the Y. As the follower 158 moves down the shank portion of the Y slot 160, the follower 154 moves back to the arcuate portion of the slot 156. The follower 158 then remains stationary at the right-hand extremity of the slot 160 while the follower 154 travels along the arcuate portion of the slot 156. The final movement of the followers is like the initial movement but in the reverse order.

It is evident that various modifications and changes may be made in the embodiments of the invention herein shown and described, without departing from the spirit or scope of the invention as defined in the following claims.

I claim:—

1. In a reversible car-seat base or the like, a fixed pedestal having an elongated cam slot extending in a front-to-rear direction and symmetrical with respect to the endwise median line of the pedestal, a seat carriage horizontally movable on said pedestal and rotatable through a half-turn from one position of use to the reverse position, a cam follower in said cam slot secured to said carriage and normally adjacent to an end of the slot when said carriage is in either of its two positions for use whereby initial rotation of said carriage is about said follower as a pivot, and auxiliary cam means carried by said pedestal and carriage for preventing movement of said follower toward the endwise median line of the pedestal until the carriage has been rotated at least thirty degrees from either position for use.

2. In a reversible car-seat base or the like, a fixed pedestal having an elongated cam slot extending in a front-to-rear direction and symmetrical with respect to the endwise median line of the pedestal, a seat carriage rotatable on said pedestal through a half-turn from one position of use to the reverse position, and means for causing said carriage to shift laterally away from an end of said pedestal during the first half of its rotating movement and to shift back toward said end during the last half of its rotating movement, said means comprising a cam follower secured to said carriage and normally engaging said cam slot near an end thereof whereby initial rotation of said carriage is about said follower as a pivot, and means carried by said carriage and pedestal for preventing movement of said follower toward the endwise median of the pedestal until the carriage has completed over half its maximum shift away from said end of the pedestal.

3. In a reversible car-seat base or the like, a fixed pedestal having an elongated cam slot extending in a front-to-rear direction and symmetrical with respect to the endwise median of said pedestal, a seat carriage horizontally movable on said pedestal and rotatable through a half-turn from one position of use to the reverse position, a pivotal cam follower in said slot secured to said carriage and normally near an end of the slot when the carriage is in either of its positions for use, whereby initial rotation of said carriage is about said follower as a pivot, and auxiliary cam means carried by said pedestal and carriage acting to shift said follower nearer the adjacent end of said slot during initial movement of said carriage from its corresponding position of use.

4. In a car-seat base or the like, a pedestal adapted to be mounted with one end adjacent to the side wall of a vehicle, a seat carriage rotatable on said pedestal through a half turn from one position of use to the reverse position and laterally slidable thereon, and means controlling the movement of said carrier, said means including two cam slots in said pedestal each symmetrical with respect to the endwise median of the pedestal, a pair of cam followers mounted on said carrier and engaging in said cam slots respectively, the line of centers of said followers being perpendicular to said median when the carrier is in either position of use, a fixed post on said pedestal located on said median line at a point remote from said end of the pedestal, and a notch on the edge of said carrier in line with said cam followers and arranged to move into and out of engagement with said post during the mid-portion of the rotation of the carrier whereby said post serves as a fulcrum for said carrier as the latter rotates through its mid-position between the positions of use, each of said cam slots having an arcuate portion concentric with said post in which said followers move while said post serves as a fulcrum.

5. In a rotating car-seat base, a stationary member having an end adapted to be fixed adjacent to the wall of a vehicle and its other end on the aisle of said vehicle, a member rotatable thereon through one hundred eighty degrees to reverse the position of a car seat carried by said rotatable member, and means for guiding the movement of said rotatable member during the rotation thereof, said means comprising an elongated cam slot extending across said stationary member in a general front-to-rear direction, a second cam slot in said stationary member symmetrical with respect to the central endwise axis thereof, said second slot extending diagonally away from said axis and toward the aisle end of said stationary member, then turning to cross said axis, then turning to extend diagonally away from the aisle end of the stationary member and toward said axis, a pair of cam followers carried by the movable member and riding in said slots respectively, and a fixed post mounted on said stationary member adjacent to the aisle end thereof, said movable member having a notch movable into engagement with said post during a portion of the rotation of said rotatable member, whereby said post acts as a temporary fulcrum as the rotatable member passes through the midportion of its rotative movement.

6. In a rotating car-seat base, a stationary member and a member rotatable thereon through one hundred eighty degrees to reverse the position of a seat mounted on said rotatable member, one of said members having a pair of cam slots therein, the other member having a pair of cam followers riding in respective slots to guide the reversing movements of the rotatable member, one of said slots being in the form of a closed curve, the other said slot having ends and lying outside of the area enclosed by the first said slot.

7. In a rotating car-seat base, a stationary member and a member rotatable thereon through one hundred eighty degrees to reverse the position of a seat mounted on said rotatable member, and means for guiding the reversing movement of said movable member, said means comprising a cam slot in one of said members in the form of a closed curve, a cam follower carried by the other said member and riding in said slot, and means for causing said follower, when the movable member is rotated through one hundred eighty degrees, to make a complete circuit of said slot in a direction opposite to the direction of rotation of said movable member.

ALFRED B. BELL.